United States Patent [19]
Kao

[11] Patent Number: 5,648,994
[45] Date of Patent: Jul. 15, 1997

[54] DIGITAL PHASE-LOCKED LOOP

[75] Inventor: Ron Kao, Saratoga, Calif.

[73] Assignees: Lite-On Communications Corp., Taipei, Taiwan; Lite-On Communications, Inc., Milpitas, Calif.

[21] Appl. No.: 528,226

[22] Filed: Sep. 14, 1995

[51] Int. Cl.$^6$ .................................................... H03D 3/24
[52] U.S. Cl. ......................... 375/376; 327/147; 327/151; 327/159; 331/25
[58] Field of Search ........................... 375/371, 373, 375/375, 376, 290; 331/1 R, 17, 18, 25, 57; 327/147, 155, 156, 159, 160, 151, 162, 163; 326/93

[56] References Cited

U.S. PATENT DOCUMENTS

| | | | |
|---|---|---|---|
| 4,855,683 | 8/1989 | Troudet et al. | 327/159 |
| 5,170,297 | 12/1992 | Wahler et al. | 375/373 |
| 5,258,933 | 11/1993 | Johnson et al. | 375/290 |
| 5,452,325 | 9/1995 | Brown et al. | 375/376 |
| 5,477,198 | 12/1995 | Anderson et al. | 331/57 |

*Primary Examiner*—Stephen Chin
*Assistant Examiner*—Don Vo
*Attorney, Agent, or Firm*—Bacon & Thomas

[57] ABSTRACT

A digital phase-locked loop adjusts the phase of a Recovered Clock in the receiver under the condition of asynchronous serial data transmission so that the phases of the transmission data are locked in order to reduce errors in read data. The digital phase-locked loop includes a zero-phase start circuit, a phase-error detecting circuit, an error-filtering circuit, a Recovered Clock adjusting circuit and a clock-generation circuit. This phase-locked loop generates a set of clocks through the detection of the transmission data level in the zero-phase start circuit so as to lock the phase of the transmission data quickly, and the phase-error detecting circuit detects the phase error between the phase of the transmission data and the phase of the Recovered Clock, after which the phase error signal is filtered through the adaptive filtering circuit for conversion into error-adjusting signals. The Recovered Clock adjusting circuit adjusts the Recovered Clock phase according to this error adjusting signal so that the phase of the Recovered Clock and the phase of the transmission data corresponds. Therefore, the digital phase-locked loop is used to reduce the mismatch between the transmission frequency of the transmitted side and the receiving frequency of the receiving said and to effectively reduce the interference from noise so that the errors in data received on the receiving side are reduced and the reliability of the network transmission is also enhanced.

6 Claims, 10 Drawing Sheets

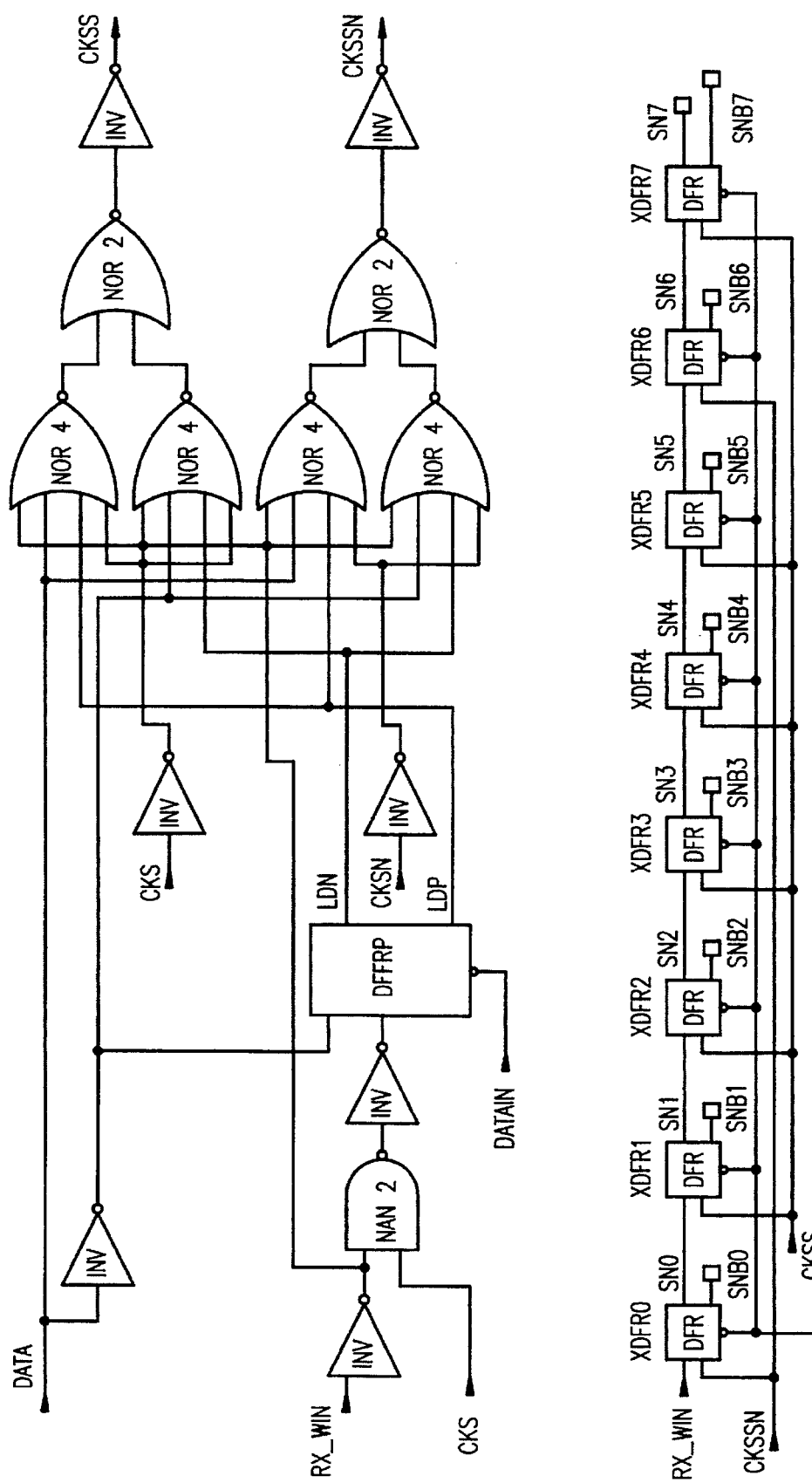
FIG. 3  dpp11

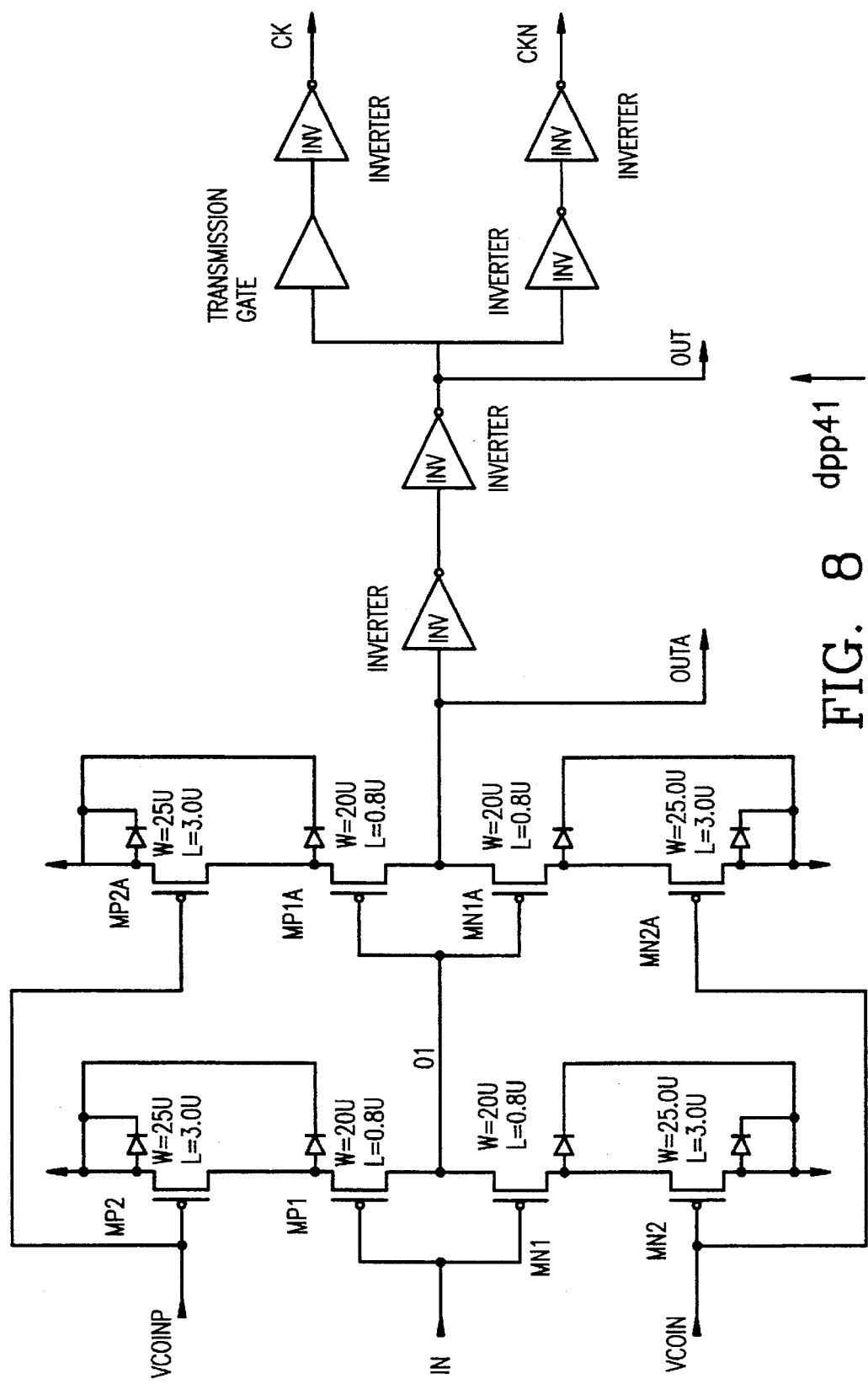
FIG. 8  dpp41

DIGITAL PHASE-LOCKED LOOP

FIELD OF THE INVENTION

The present invention relates to a phase-locked loop, especially, to a digital phase-locked loop with serial signals.

BACKGROUND OF THE INVENTION

Recently, computer use has greatly increased. In order to share information between a plurality of computers, networks are used to connect computers; for example, Ether-Net is generally used as the transmission structure between computers. Generally speaking, the transmission mode of Ether-Net is a type of asynchronous transmission, and the transmission medium used in this network is coaxial cables. Since asynchronous serial transmission is used, the working frequency of transmitter must be the same as that the receiver, so as to ensure correction of data transmission. A data sampling method has been used in some applications, in which the transmission data is sampled by a sampling clock at a frequency that is higher than that of the Recovered Clock RXC in the protocol. Usually the sampling clock frequency is 16 times that of the Recovered Clock RXC. Since asynchronous transmission data has a start bit, the receiver repeatedly reads transmission data levels at the sampling clock, which is defined as the reference frequency. Once the start bit is detected, then the receiver will read data by using a receiving frequency. Usually, the Transmitting Clock TXC and Recovered Clock RXC frequency are determined in the protocol and are generated from the oscillators of the transmitter and receiver, respectively. But because the electronic circuitry and transmission medium may be interfered with so that the Transmitting Clock TXC of the transmitter and the Recovered Clock RXC of the receiver are not matched, causing some errors in the data read on the receiver, thus reducing the reliability of the network.

SUMMARY OF THE INVENTION

Accordingly, the present invention provides a new phase-error detection technology and a new adaptive filtering method which are effective in a digital phase-locked loop. This invention is used to reduce the mismatch between the TXC of the transmitter and the RXC of the receiver and to effectively reduce the noise interference, so that the errors in data received are reduced and the transmission reliability of the network is also enhanced.

The digital phase-locked loop of the present invention comprises a zero-phase start circuit, a phase-error detecting circuit, an error-filtering circuit, a Recovered Clock adjusting circuit and a clock-generation circuit. This phase-locked loop generates a set of clocks through the detection of the transmission data levels in the zero phase start circuit so to lock the phase of the transmission data quickly, and detects the phase error between the transmission data and the Recovered Clock by using a phase error detecting circuit, after which the phase error signal is filtered through the adaptive filtering circuit to convert it into error adjusting signals. The Recovered Clock adjusting circuit adjusts the Recovered Clock phase according to these error adjusting signals so that the phase of the Recovered Clock and the phase of the transmission data are matched. In addition, the clock-generation circuit provides a plurality of even phases and a high frequency clock with zero-skew as the working frequency of the digital phaser-locked loop of the present invention.

In the present invention an adaptive filtering method is provided simultaneously for responding to errors more sensitively. The adaptive filtering method provides a fine adjustment and fast adjustment for responding to the detected errors. If the detected error is within the region of fine adjustment, then the error counter is used to accumulate the number of errors as the function of an analog filter with unit gain. When the accumulated value is equal to a critical value of errors, a response will be induced for transmitting an adjusting signal. If the detecting error is within the region of fast adjustment, then it will directly generate a prompt response without counting to transmit an adjusting signal. Such a nonlinear response retains the corresponding condition between the Recovered Clock and the data phase, and can be used to steady the feedback loop with noise.

BRIEF DESCRIPTION OF THE DRAWINGS

FIG. 3 is a displacement counting circuit of the phase error detecting circuit in the block diagram of FIG. 1.

FIG. 8 is a current control inverse circuit of the clock generating circuit in FIG. 7.

DETAILED DESCRIPTION OF THE PREFERRED EMBODIMENT

Figure 1:
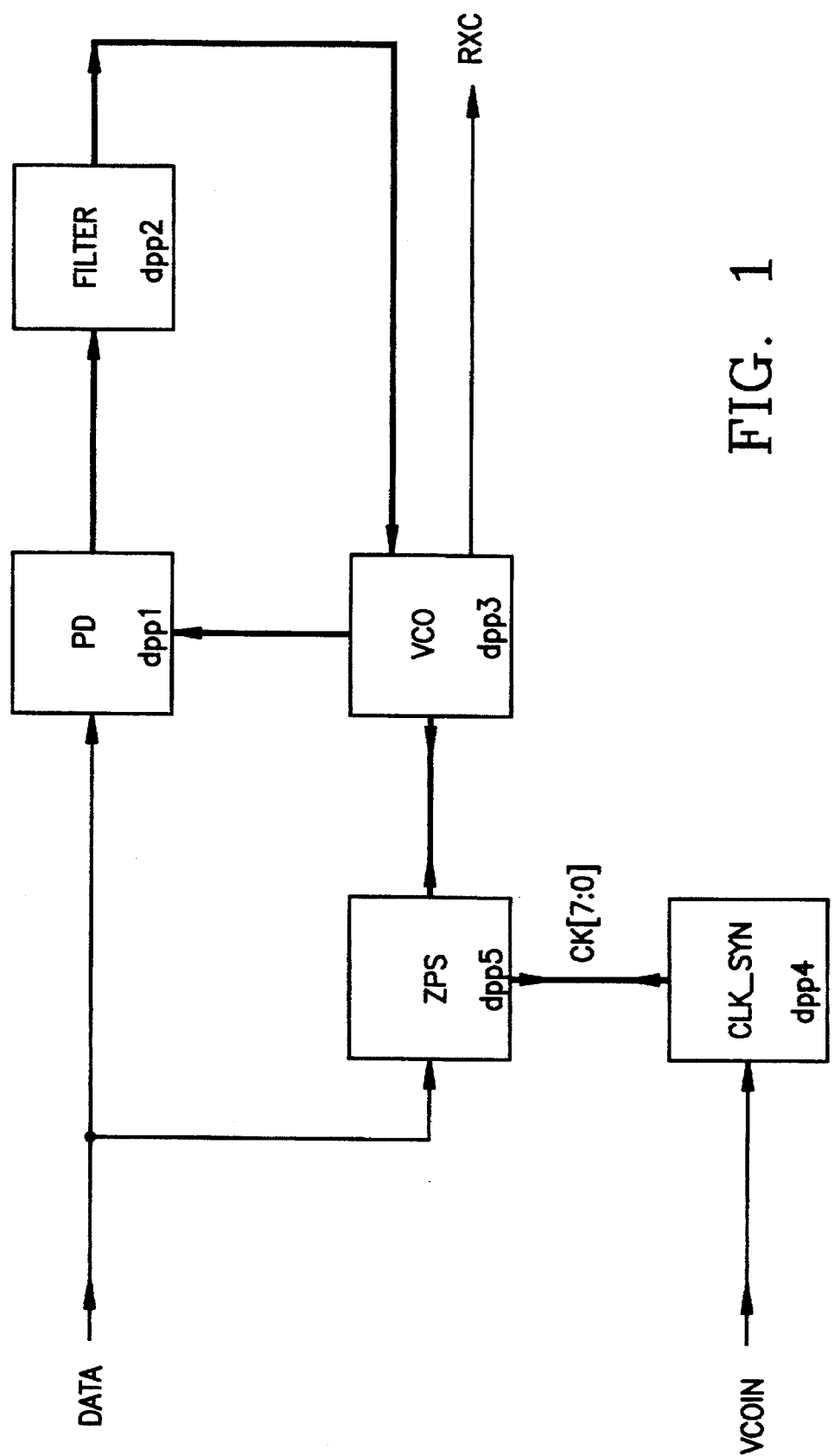
FIG. 1 is a block diagram of the digital phase-locked loop of the present invention.

Referring to FIG. 1, the digital phase-locked loop of the present invention comprises a zero-phase start circuit (ZPS) dpp5, a phase-error detecting circuit(PD) dpp1, an error-filtering circuit (FILTER) dpp2, a Recovered Clock adjusting circuit (VCO) dpp3 and a clock-generation circuit (CLK-SYN) dpp4.

Figure 2:
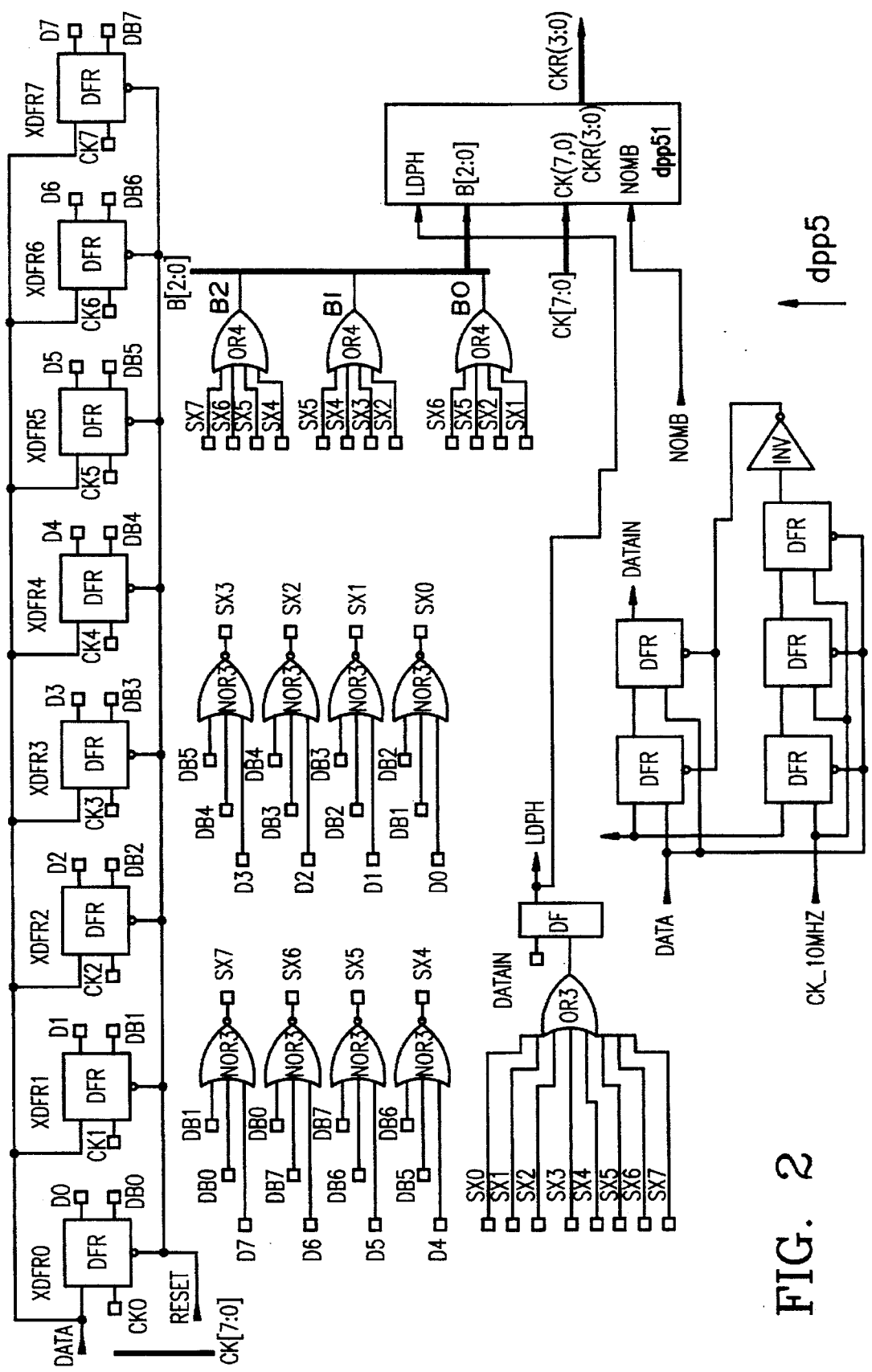
FIG. 2 is a zero-start circuit in the block diagram of FIG. 1.

Referring to FIG. 2, the zero-phase start circuit dpp5 generates a transition location signal SX[7:0] by detecting the transmission data level and corresponding trigger of a working clock CK[7:0] generated from clock-generation circuitdpp4 described hereinafter. If the transition location signal SX[7:0] is in the state of zero-phase start (as will be described hereinafter), then a loading signal LDPH and a set of rotating selection signals B[2:0] are generated. The working clock CK[7:0] is rotated by the zero-phase clock rotation circuit dpp51 (referring to FIG. 2A) according loading signal LDPH and the set of rotating selection signals B[2:0] for generating a rotation clock CKR[3:0] which is phase-locked with the transmission data. The circuit dpp52 as shown in the FIG. 2 is a multiplex circuit (referring to FIG. 2B).

Figure 2A:
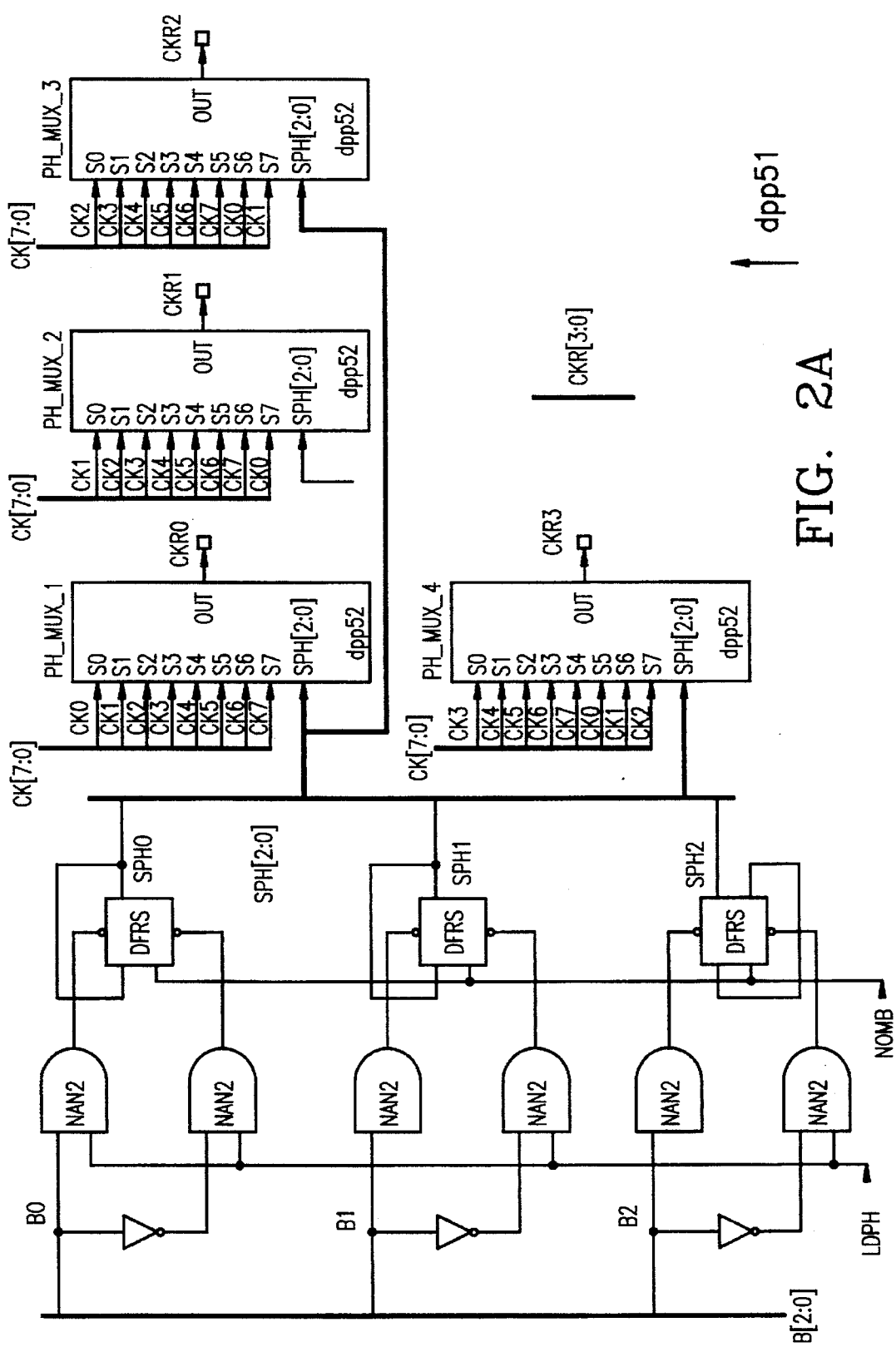
FIG. 2A is a zero-phase clock rotation circuit of the zero-start circuit in FIG. 2.
Figure 2B:
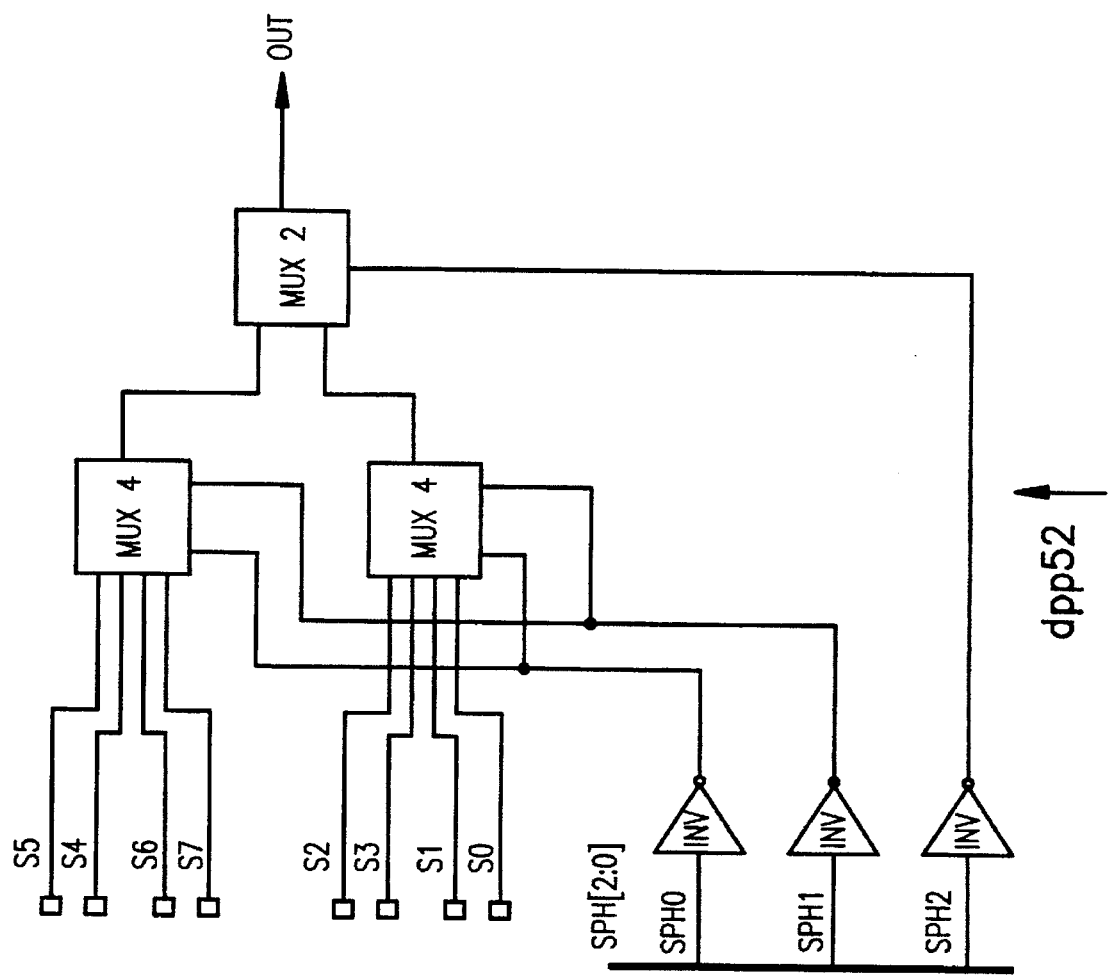
FIG. 2B is a multiplexer circuit in the zero-phase clock rotation circuit in FIG. 2A.

Now referring to FIGS. 2, 2A and 2B, the transmission data are at a HI level if there is no data transmitted, and the data input signal DATAIN are at a LO level. The working clock CK[7:0] triggers D type flip-flop XDFR0-7 so that all the transition location signals SX[7:0] are in the state of LO.

If the data is transmitted, the initial bit is transferred to LO from HI, and because of the trigger of the working clock CK[7:0], a bit of the transition location signal SX[7:0] is transferred to HI, resulting in the so called "zero-phase start". Since the data input signalDATAIN is HI, the transition location signals SX[7:0] will cause the phase loading signal to transfer to HI by the rising clock generated by OR gate. The zero-phase clock rotation circuit dpp51 is triggered by the phase loading signal (referring to FIG. 2A), and is decoded by the transition location signals SX[7:0] for generating the rotation selection signal SPH[2:0] which is the selection line of the multiplex circuit dpp52 from which the working clock is rotated to generate a set of rotating clock CKR[3:0]corresponding to the phase of the input data. Accordingly, the phase start circuit can be aligned quickly with the phase of the transmission data DATA.

Figure 4:
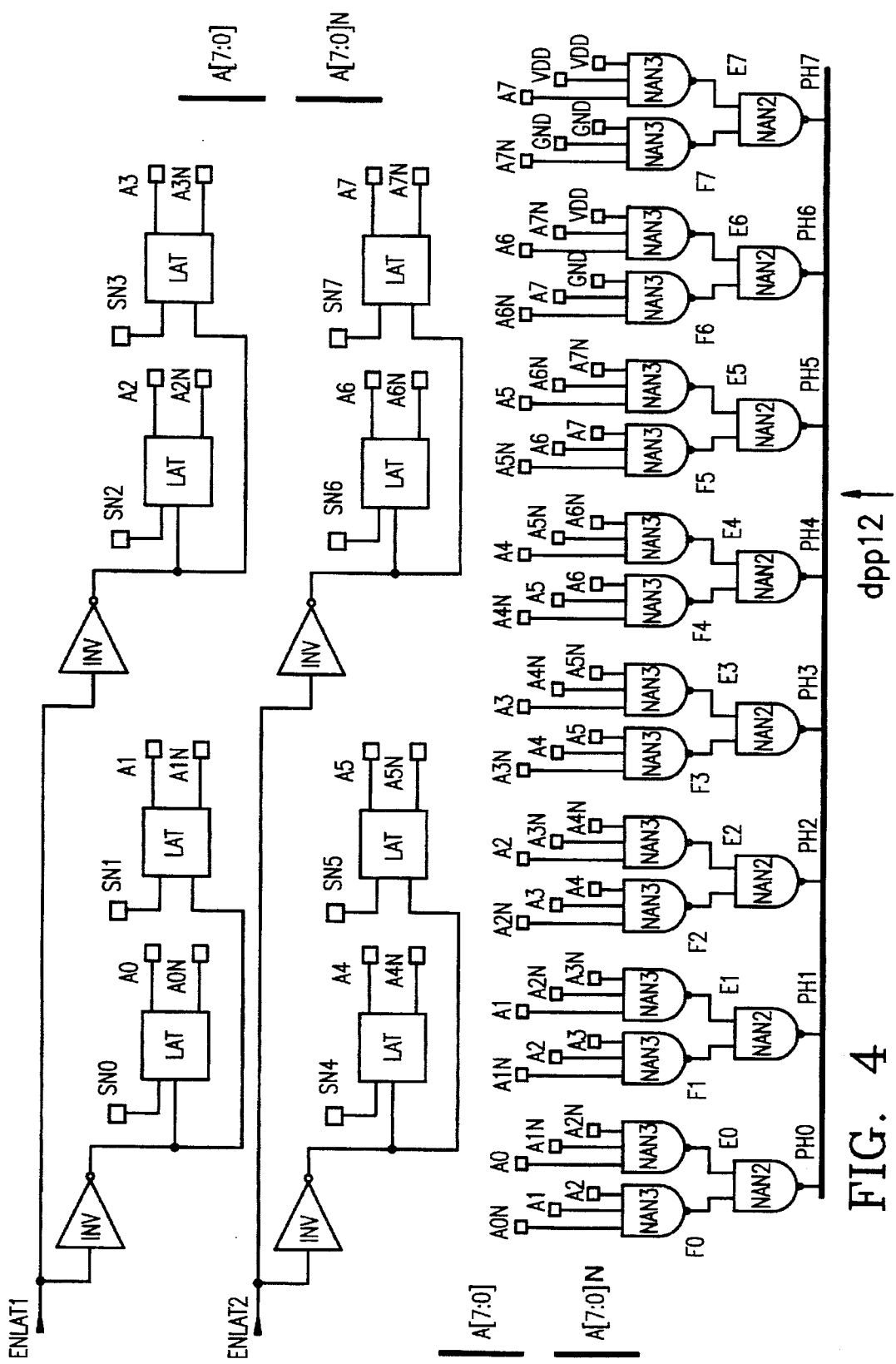
FIG. 4 is a phase-decoding circuit of the phase error detecting circuit in the block diagram of FIG. 1.

The phase-error detecting circuit dpp1 consists of a displacement counting circuit dpp11 as shown in FIG. 3 and a phase-decoding circuit dpp12 as shown in FIG. 4. The phase-error detecting circuit dpp1 uses a bound window RX_Win with a +−¼transmission data period (T, for example 100 ns) to bound the phase change of the transmission data and measure the position of the phase change (rising or falling) and uses the generated over-sample clock to decide the off-phase length of the data change within the window. When the bound window RX-Win signal is active (HI), a sampling clock CKSS and CKSSN are generated until the phase of the transmission data DATA is changed.

The sampling clock CKSS and CKSSN trigger the displacement register counter formed by a plurality of flip-flop XDFRO-7 to drive a set of sampling signals SN[7:0], and the trigger signal of the ENLATs 1,2 generated by the Recovered Clock adjusting circuit dpp3 (as will be described hereinafter) generates a set of phase data PH[7:0]. Because the bound window is derived according to the Recovered Clock RXC, the phase error can be determined from the changed phase within the window, i.e., phase data PH[7:0].

Figure 5:
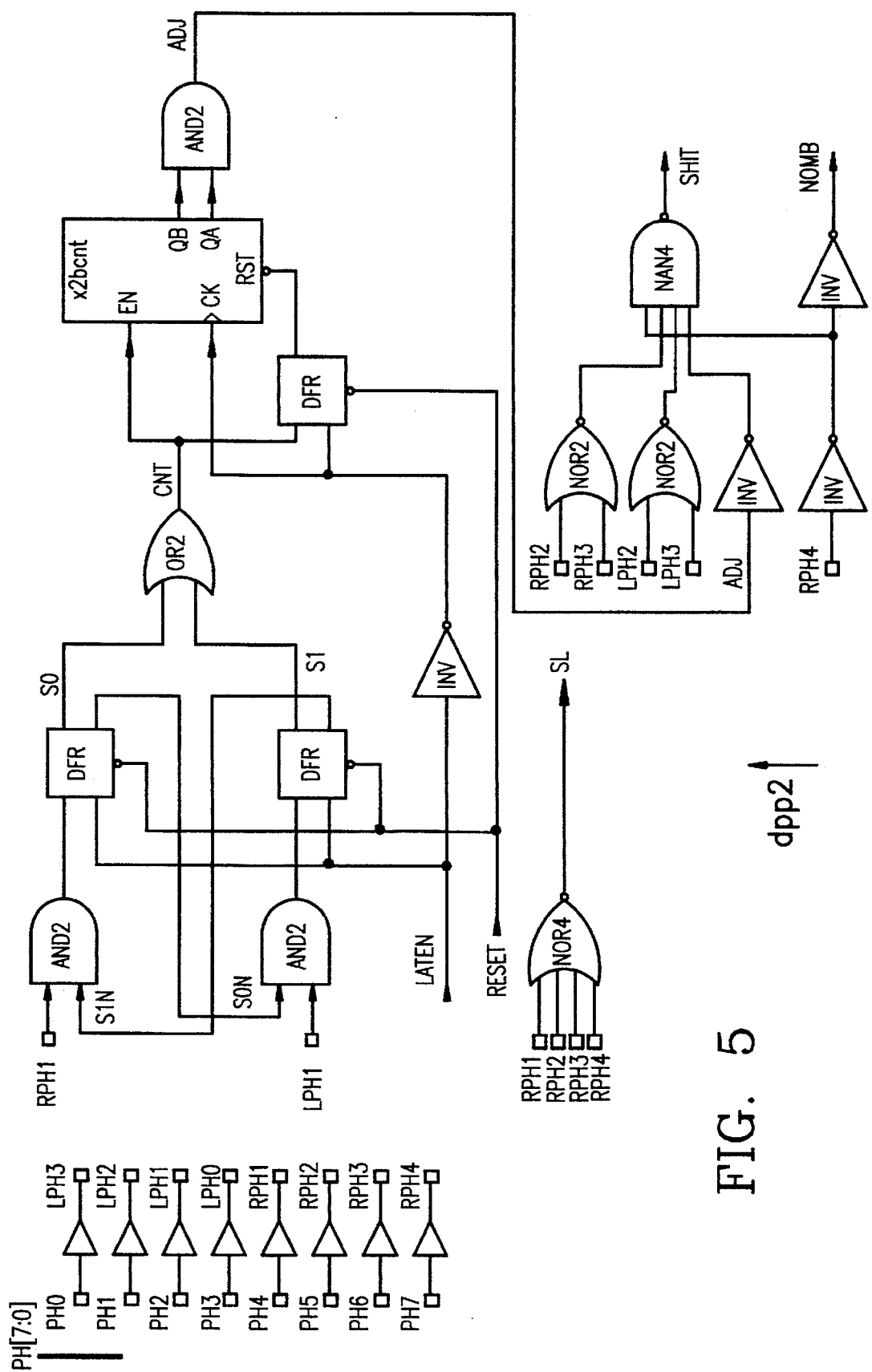
FIG. 5 is an error filtering circuit in the block diagram of FIG. 1.

The data within the displacement register counter is decoded by the decoding circuit dpp12 to derive the phase data PH[7:0], and thus, the phase difference between the Recovered Clock and phase of transmission data is derived. After the phase data PH[7:0] are transferred to the adaptive filtering circuit dpp2, the adaptive filtering circuit dpp2 properly responds in accordance with the phase data PH[7:0]. Now referring to FIG. 5, when the LPH0 is HI, it represents that the phase between the Recovered Clock RXC and transmission data is phase-locked and shows no phase error.

If LPH1 or RPH1 is HI, the adaptive filtering circuit dpp2 are within the region of the fine adjusting response, whereupon the counter X2BCNT is used to count the accumulated errors. When accumulated errors with one orientation (i.e. the Recovered Clock is always faster than or is always slower than the transmission phase) are obtained a predetermined number of times, for example, three times, i.e. QA and QB of X2BCNT are HI simultaneously, the output of ADJ is set to HI and the SHIT is set to HI also, so that the phase of the Recovered Clock RXC will be adjusted. If one of the outputs of LPH2, LPH3, RPH2 or RPH3 is HI, then it is in the region of fast response. At that time, the output of the counter X2BCNT is not considered, but the output of SHIT is set to HI to adjust the Recovered Clock RXC. Moreover, because the phase of Recovered Clock may be faster or slower then the phase of the transmission data, a slow adjust signal SL is used to indicate the adjusting speed of the RXC. If all the signals of RPH1-4 are LO, the output of the slow adjust signal is set to HI, causing the Recovered Clock RXC to be slowed down. Also, if the signal RPH4 is HI, it indicates that there were no phase change within the bound window RX-Win. In order to detect the phase change promptly within the bound window RX-Win, the NOMB is set to HI, and then the zero-phase clock rotation circuit dpp51 within zero-phase start circuit dpp5 adjusts the CKR[3:0] two phases so that the phase of RX_Win can be adjusted to the changed position of transmission data at 2 bit times.

Figure 6:
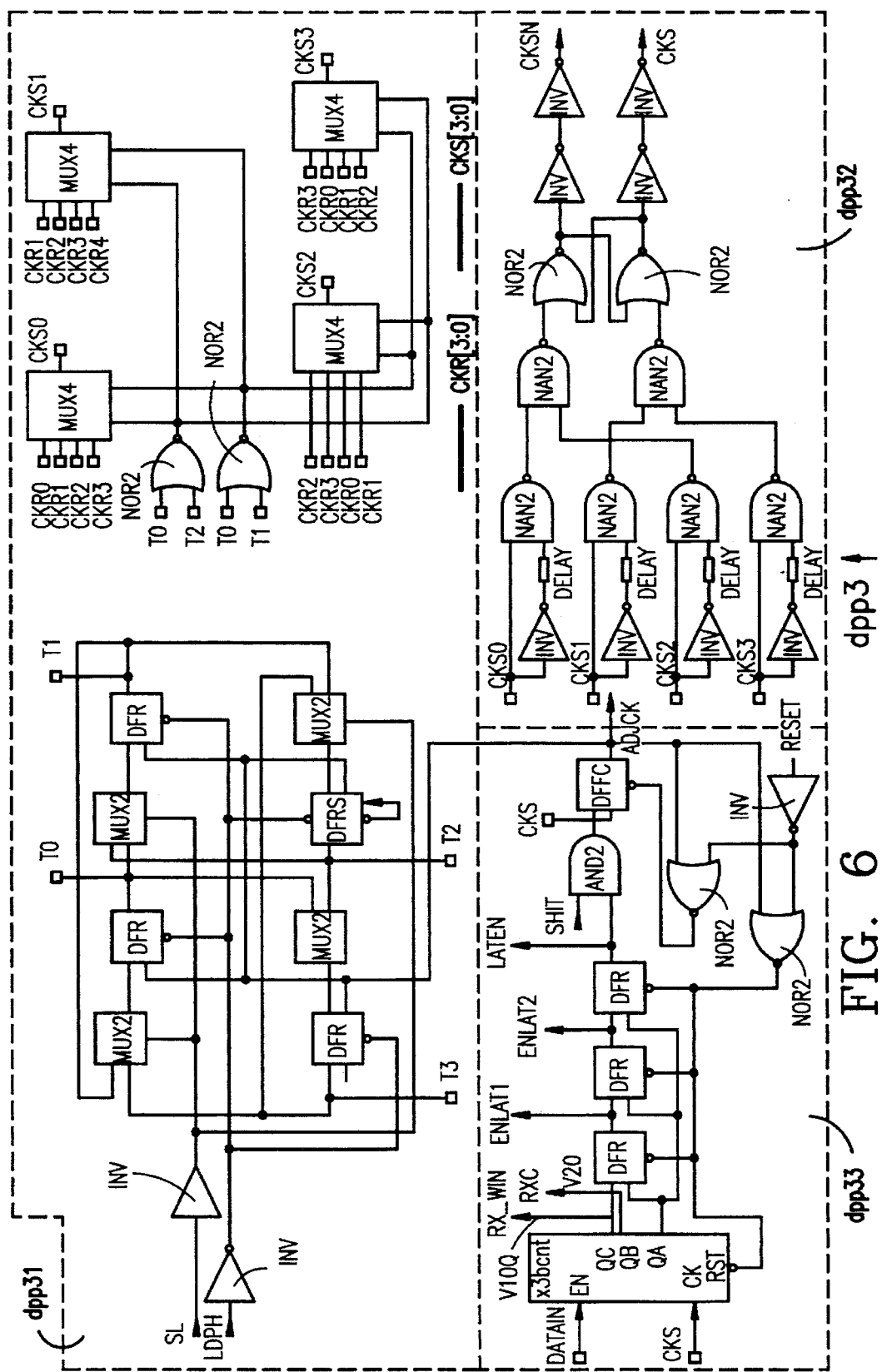
FIG. 6 is a Recovered Clock adjusting circuit in the block diagram of FIG. 1.

If the adjusting signal SHIT of the error filter circuit dpp2 is non-active, i.e. the output of SHIT is LO, indicating that there are no phase differences between the phase of the Recovered Clock RXC and the transmission data; at this time the Recovered Clock adjusting circuit will not adjust the Recovered Clock RXC. If the adjusting signal SHIT is set to HI, then the Recovered Clock RXC will be adjusted by the Recovered Clock adjusting circuit dpp3 according to the slow adjust signal SL. The Recovered Clock adjusting circuit dpp3 as shown in FIG. 6 comprises a phase shift circuit dpp31, a double frequency circuit dpp32 and a bound window and Recovered Clock-generation circuit dpp33. When dpp3 shifts (adjusts) the phase, it will generate a phase-shift multiplex selection signal T[3:0] with respect to the trigger of the adjusting clock ADJCK and the slow adjust signal SL. A set of sampling clock signals CKS0–CKS3 corresponding to the signal CKR0–CKR3, respectively, are selected with respect to four multiplexers MUL4A selected by phase shift multiplex selection signal T[3:0]. At the same time, a set of double frequency clocks CKS and CKSN are generated from the sampling clock signals CKS0–CKS3 by a double frequency circuit dpp32. Then the clock CKS is used as a clock trigger signal of the counter X3BCNT in order to generate the bound window signal RX-Win, Recovered Clock RXC, and other signals and a flip-flop is used to generate ENLAT1 and NELAT2. The so called "phase adjustment" means thus adjusts the phase difference between the phase of the Recovered Clock RXC and the phases of the transmission data.

Figure 7:
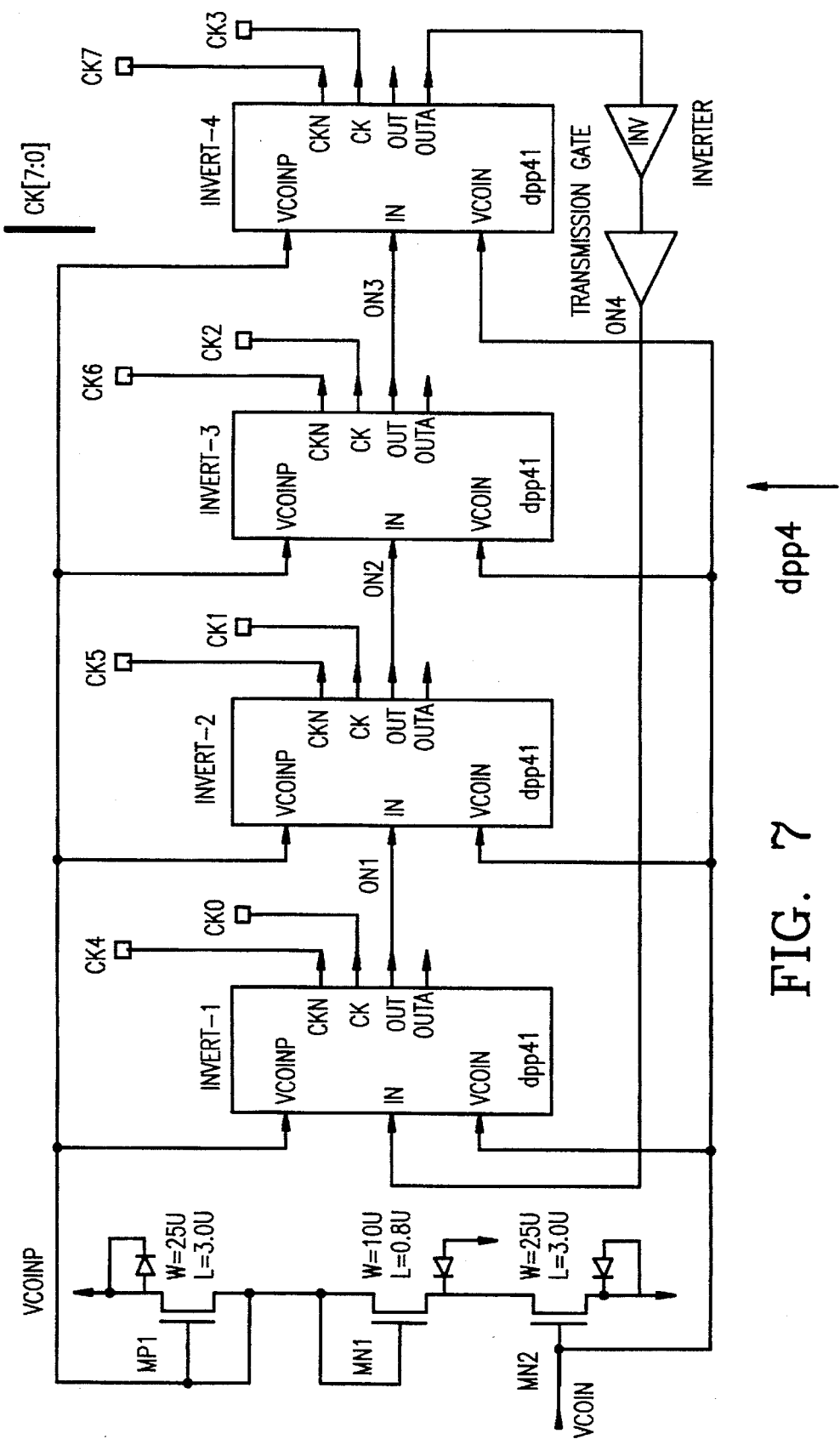
FIG. 7 is a clock-generation circuit in the block diagram of FIG. 1.

In the circuit, the working clock CK[7:0] is generated from clock-generation circuit dpp7 (referring to FIGS. 7 and 8). Thus clock-generation circuit is constructed from the 4 cascades current controlled inverter (inverter-1,2,3,4, as shown in FIG. 8) to form a circular oscillator. A typical analog phase-locked loop is used to control the frequency of the circular oscillator. The frequency is controlled by VCOIN. In order to cancel changes during rise or fall, each of the current-controlled inverters is provided with two inverted cells. Therefore, the working clock generated from the clock-generation circuit dpp4 is a set of clocks with even phases and zero-skew. In such a circular oscillator, the output from the last inverter is inverted to feedback to the first inverter, i.e. the output OUTA of last inverter INVERT-4 as shown in FIG. 7 is inverted for connecting to the input IN of the first inverter INVERT-1 through INV1 so to form a differential ring, in order to generate a clock with working period equalling ½.

The effect of the present Invention

The digital phase-locked loop of the present invention comprises a zero-phase start circuit, a phase-error detecting circuit, an error-filtering circuit, a Recovered Clock adjusting circuit and a clock-generation circuit. This phase-locked loop generates a set of clocks through the detection of the transmission data level in the zero-phase start circuit so to lock the phase of the transmission data quickly, and detects the phase errors between the phase of the transmission data and the phase of the Recovered Clock by using a phase error detecting circuit, and then the phase error signal is filtered through the adaptive filtering circuit for converting into error adjusting signals. The Recovered Clock adjusting circuit adjusts the Recovered Clock phase according to this error adjusting signal so that the phase of the Recovered Clock and the phase of the transmission data are matched. Therefore, the digital phase-locked loop is used to reduce the mismatch between the transmission frequency of the transmitting side and the receiving frequency of the receiving side and to effectively reduce the noise interference so that the error in data received on the receiving side is reduced and the reliability of the network transmission is also enhanced.

What is claimed is:

1. A digital phase-locked loop comprising:

a clock-generation circuit that generates a set of working clocks;

a zero-phase start circuit that generates a set of reference clocks by using high frequency sampling to detect a transmission data level to initially lock the phase of said transmission data quickly;

a digital phase-error detecting circuit that detects a phase bias between said transmission data and said reference clocks by means of high frequency clock sampling on the data to generate a phase error using a bound window as a reference bound to detect a distance between the data transitions and the reference defined by the window;

an adaptive error-filtering circuit including a digital accumulator/counter that averages phase errors to generate error-adjusting signals; and a Recovered Clock adjusting circuit that adjusts a Recovered Clock RXC to lock the phase between said transmission data and said RXC in accordance with said error adjusting signals by selecting from a plurality of different clock phases according to the error adjusting signals.

2. A digital phase-locked loop according to claim 1, wherein the phase-error detecting circuit determines the time between said bound window and the level change of said transmission data according to the count of a displacement register counter, said time of said register counter is used to determine the phase differences between said Recovered Clock and said transmission data, and said register counter is triggered by a single high-frequency clock.

3. A digital phase-locked loop according to claim 2, wherein said time of said register counter is decoded to derive the phase differences between the Recovered Clock and transmission data.

4. A digital phase-locked loop according to claim 1, wherein said adaptive error-filtering circuit has different critical points according to different responses which are non-linear responses.

5. A digital phase-locked loop according to claim 1, wherein the phase of said Recovered Clock is shifted by said Recovered Clock adjusting circuit according to the shift of a phase-shifter so as to generate said bound window in order to be used by the error-detecting circuit.

6. A digital phase-locked loop according to claim 1, wherein said clock-generation circuit is constructed from a circular oscillator which comprises an even number of a plurality of series-connected, dual current controlled inverters, the output of the last inverter is inverted and fed back to the first inverter so as to form an even number of differential rings, and thus time changes between the rising and falling of said clocks are offset so as to generate clocks with zero-skew.

* * * * *